Oct. 26, 1937. C. E. JOOS 2,097,158

WATER HEATING AND DEAERATING APPARATUS

Filed May 15, 1936 3 Sheets-Sheet 1

INVENTOR
Charles E. Joos
BY
John E. Hubbell
ATTORNEY

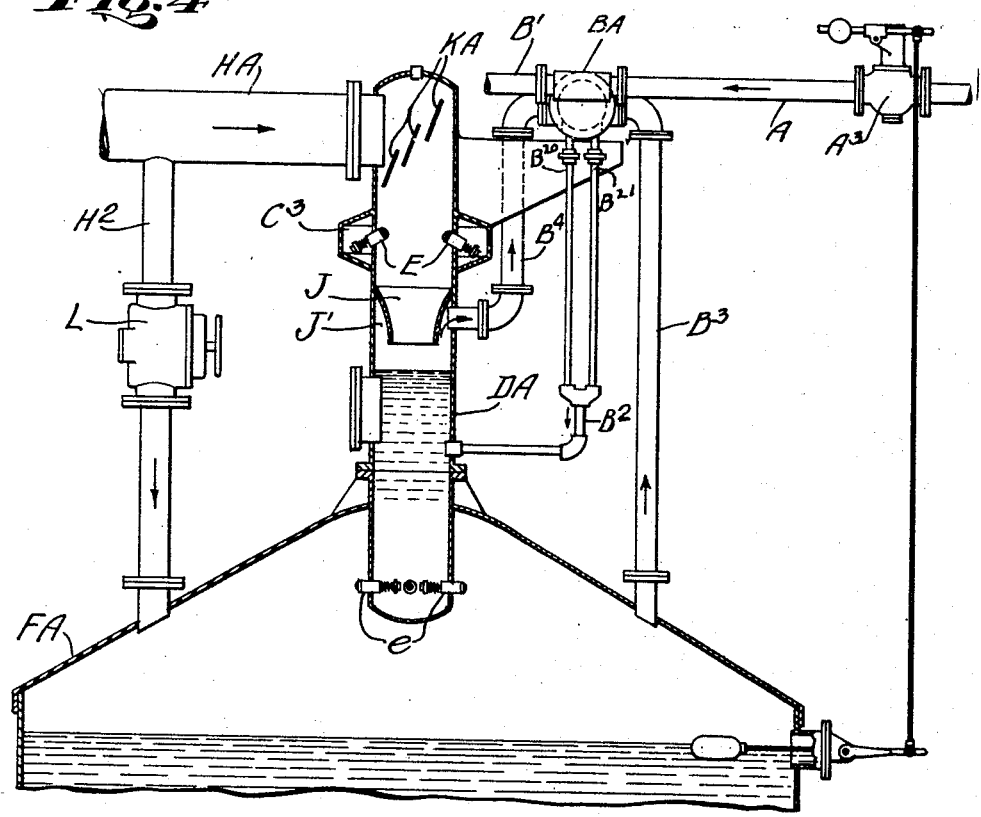
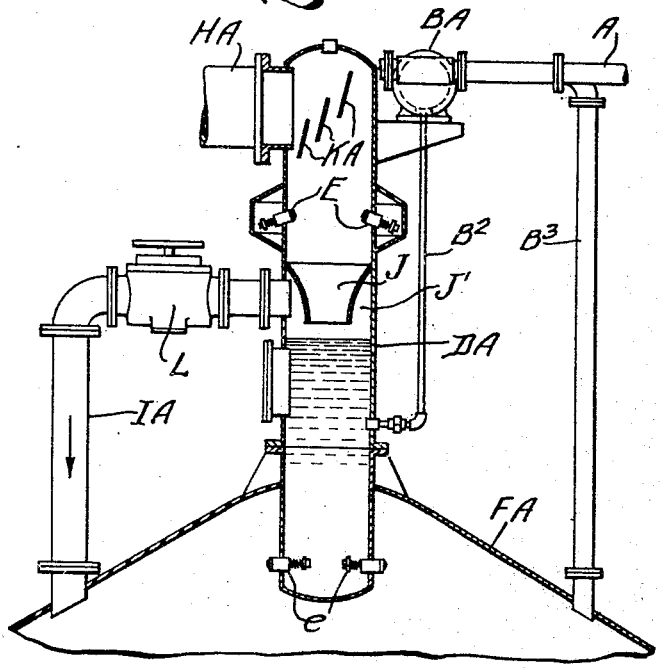
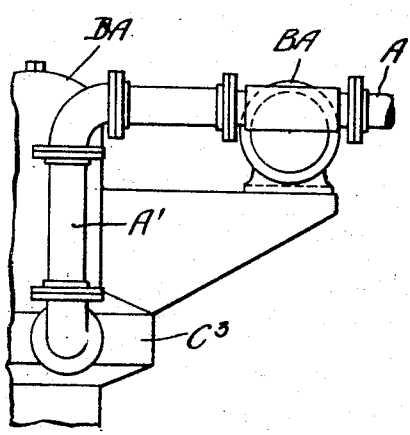

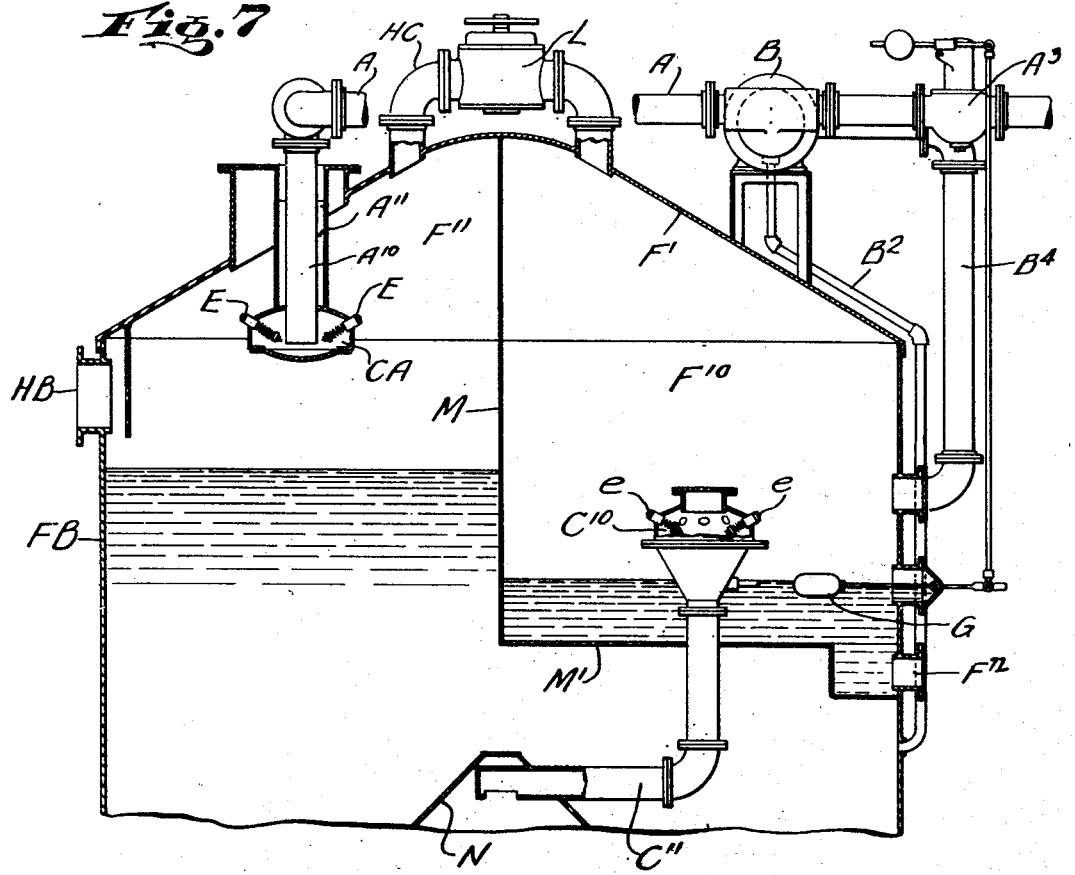
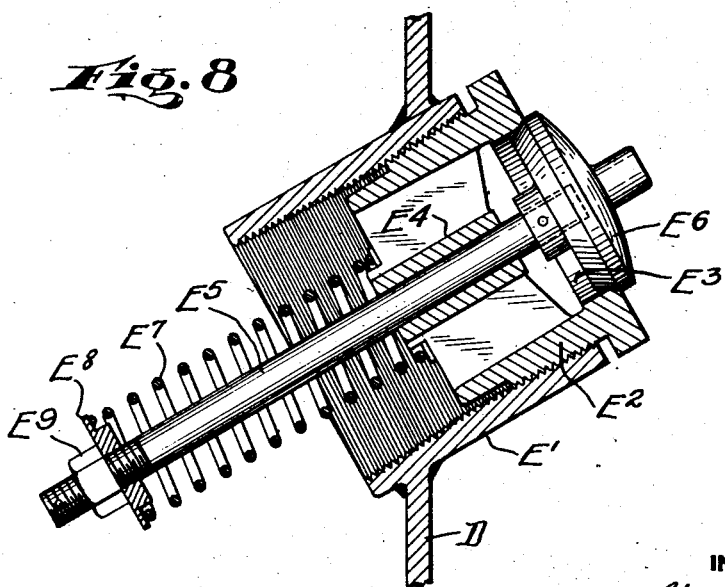

Patented Oct. 26, 1937

2,097,158

UNITED STATES PATENT OFFICE 2,097,158

WATER HEATING AND DEAERATING APPARATUS

Charles E. Joos, Philadelphia, Pa., assignor to Cochrane Corporation, Philadelphia, Pa., a corporation of Pennsylvania Application May 15, 1936, Serial No. 79,869

9 Claims. (Cl. 261—118)

The general object of the present invention is to provide improved apparatus for heating and deaerating water used for boiler feed water and other purposes. More specifically, the object of the invention is to provide simple and effective apparatus for heating and deaerating water by injecting the water into a steam atmosphere in the form of fine jet or spray streams, so that the water is dispersed in finely divided form throughout a steam containing space of considerable volume, whereby the intimate contact of water and steam necessary for the rapid and effective heating and deaeration of the water is obtained without the use of the water spreading and retarding baffles or trays which are characteristic of water heating and deaerating apparatus now in general use.

Existing forms of water heating and deaerating apparatus including trays for retarding the downflow of water through a steam filled space, and for dividing the downflowing water into film-like and broken streams are efficient and generally satisfactory in many cases, but when used in the treatment of water from which impurities are precipitated as a result of the heating of the water, and/or the addition of chemical purifying reagents thereto, the deposits of the impurities on the trays or baffles of such apparatus is an objectionable feature avoided by the use of the present invention. In general, moreover, tray apparatus for heating and deaerating water is inherently more bulky, and more expensive to construct, than apparatus embodying the present invention.

The improved apparatus comprises primary and secondary chambers through which the water is passed in series, and each of which includes a lower water holding or reservoir space and an upper steam space into which the water introduced into the chamber is sprayed. The improved apparatus also includes means for supplying steam to, and withdrawing air from each chamber as required to maintain in the steam space of the chamber an atmosphere consisting of steam admixed with but little air. In the operation of the improved apparatus the water is normally heated to within two or three degrees of the temperature in the steam space in the primary chamber, so that the water needs but little, if any, additional heating in the secondary chamber and the amount of air separated from the water in that chamber is correspondingly small.

In some forms of the present invention all of the steam used for heating and deaerating purposes is initially supplied to the primary chamber and in other forms to the secondary chamber of the apparatus, and in such other forms of the invention, the steam not condensed in the chamber into which it is initially introduced, and the air liberated therein and admixed with the uncondensed steam, is passed from the last mentioned chamber into the other chamber which has an air vent from which all of the air liberated in both chambers ultimately escapes. In lieu of initially supplying all of the steam to one only of the two chambers, each of those chambers may have a separate steam supply.

In some forms of the present invention, the pressures in the steam spaces of the two chambers may be equal or approximately equal. In other forms of the invention, however, means are provided for maintaining a steam pressure in the primary chamber which is a pound or so higher than the steam pressure in the second chamber, so that the temperature of the water sprayed into the secondary chamber will be at the boiling temperature in that chamber, or even a little higher, in which case some of the water will flash into steam as it enters the secondary chamber.

In all of its forms, the invention is characterized by the use of spray discharge means consisting of one or more spray nozzles, each having its inlet connected to the lower portion of the primary chamber and discharging into the steam space of the secondary chamber and including a loaded valve, which is opened and closed by and in accordance with increases and decreases in the hydrostatic head at the nozzle inlet, whereby the accumulation of water in the primary chamber is confined to the lower portion thereof and does not interfere with the maintenance of the upper steam space in the chamber. In practice the spray discharge nozzles are constructed and adjusted to avoid much change in water level in the primary chamber as the rate at which water is introduced into and discharged from that chamber varies between the no load and full load conditions of the apparatus. Such spray nozzles possess the further advantage of giving desirable form to the spray discharge at practically all loads, and such spray nozzles may and preferably are used to spray the water into the primary chamber.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:

Fig. 4 is a view taken similarly to Fig. 1 illustrating a second form of the invention;

Fig. 5 is an elevation of a portion of the apparatus shown in section in Fig. 4;

Fig. 6 is an elevation partly in section illustrating a modification of a portion of the apparatus shown in Figs. 4 and 5;

Fig. 7 is a view taken similarly to Fig. 1 illustrating still another form of the invention; and Fig. 8 is a sectional elevation of a spray nozzle.

Figure 1:
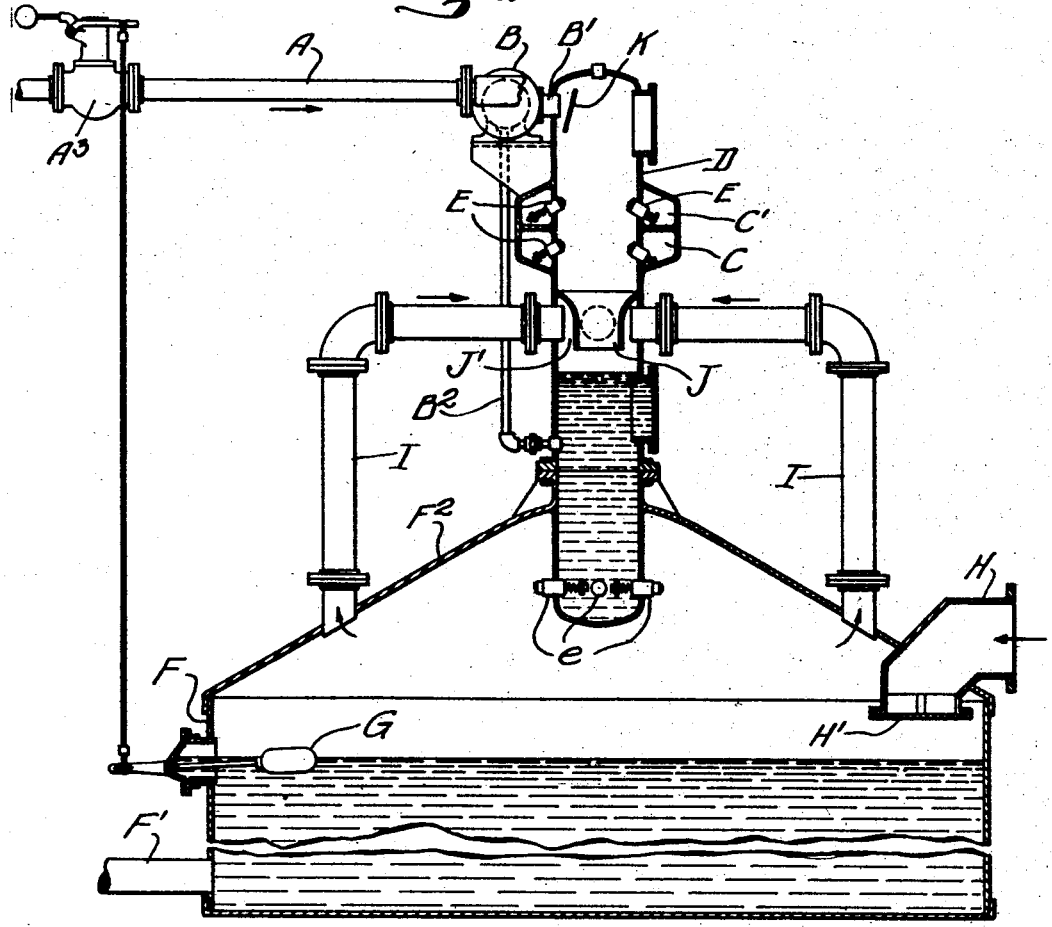
Fig. 1 is an elevation partly in section of a portion of water heating and deaerating apparatus embodying one form of the invention.
Figure 3:
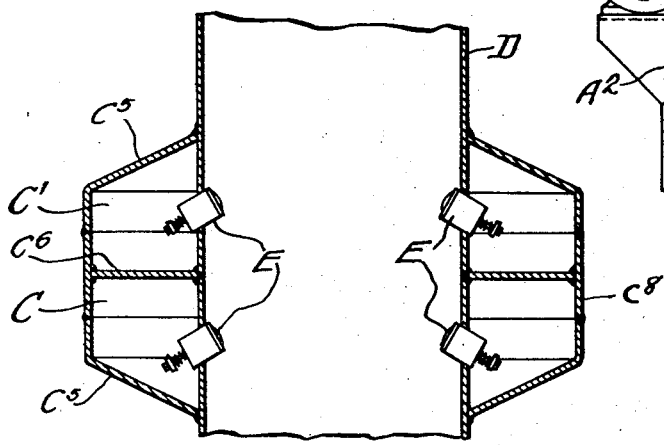
Fig. 3 is an enlarged section of a portion of the apparatus shown in section in Fig. 1.
Figure 2:
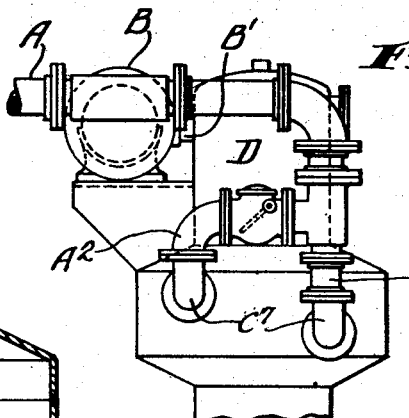
Fig. 2 is an elevation of a portion of the apparatus shown in section in Fig. 1.

In the embodiment of the invention illustrated in Figs. 1, 2 and 3, the water to be heated and deaerated is supplied through a raw water supply pipe A leading to the water inlet of a vent condenser B which has its water outlet connected by a pipe A' and branch pipe $A^2$ to annular spray nozzle supply chambers C and C' surrounding a vertically disposed drum D into which water is sprayed from each of the chambers C and C' through a spray nozzle E, or preferably and as shown, a plurality of spray nozzles E distributed about the axis of the drum, and each mounted in and extending through the wall of the drum. The water sprayed into the drum D and collecting in the closed lower end of the latter is discharged through a spray nozzle, or preferably and as shown, a plurality of spray nozzles $e$, mounted in and extending through the wall of the drum D adjacent its lower end.

The nozzles $e$ discharge into the steam space in the upper portion of a tank F which serves as a storage tank for the water treated, and in which the final portion of the water heating and deaerating operation is effected. Water passes from the tank to the boiler or other apparatus using the water, through an outlet F'. The tank F thus forms the secondary chamber, and the drum D forms the primary chamber, of the improved heating and deaerating apparatus. The supply of water to the apparatus is regulated as required to maintain a water level in the tank F about as indicated in Fig. 1 by means of a float G adjusting a regulating valve $A^3$ of any usual or suitable form in the raw water supply pipe A. As shown the lower portion of the drum D is welded to and extends through the convex roof or upper head $F^2$ of the tank F.

Steam for the water heating and deaerating operation is supplied by a pipe H opening into the steam space of the tank F, and shown as discharging steam downwardly against a horizontal baffle plate H' below the downturned discharge end of the pipe H and above the water level in the tank F. Steam not condensed in the tank F and air liberated therein pass from the steam space of the tank F to the drum D at a level about midway between its upper and lower ends, through one or more pipes I. In the arrangement shown, there are four pipes I symmetrically spaced about the axis of the drum D and each comprising a vertical portion having its lower end mounted in the tank roof $F^2$ and an upper horizontal portion extending radially away from the drum D. The latter is shown as provided with an annular baffle J dividing the adjacent portion of the drum space into an annular chamber J' closed at its upper end and open at its lower end and through which the water discharged by the nozzles $e$ descends, and through which air and uncondensed steam supplied through the pipes I and chamber J' may ascend. The nozzles E are located at levels intermediate the top of the drum and the baffle J.

At its upper end the drum D is provided with an outlet B' to the condensing space of the vent condenser B, which may be of the usual surface condenser type with its condensing space separated from its water space by heat conducting walls. Water of condensation collecting in the condensing space is passed to the drum D, preferably below the water level in the latter by a drain pipe $B^2$. Air escapes from the condensing space into the atmosphere through the usual air vent, not shown. A baffle K within the upper portion of the drum D tends to prevent the discharge of water through the outlet B' as a result of air entrainment or as a result of the splash or discharge from the nozzles E.

Each nozzle E is preferably of a type insuring a proper spray discharge at light as well as heavy rates of water supply and advantageously is so disposed that the axis of its discharge is inclined upward to the horizontal. In the desirable form illustrated in Fig. 8, each spray nozzle E comprises a tubular body E' which projects through an opening formed for the purpose in the wall of the drum D and is welded to said wall. As shown the tubular body E' is internally threaded to receive a tubular member $E^2$ provided with a discharge port $E^3$ and with an internal spider $E^4$ forming a bearing for the stem $E^5$ of a valve or spray disc $E^6$ which is constantly urged toward the position in which it closes the port $E^3$ by a loading spring $E^7$ surrounding the valve stem $E^5$ and acting between the spider $E^4$ and an abutment $E^8$ connected to the stem $E^5$. As shown the abutment $E^8$ is a nut threaded onto the outer end of the stem $E^5$ and normally locked in any desired adjustment by a lock nut $E^9$. By adjustment of the abutment $E^8$ along the stem $E^5$, the tension of the spring may be made whenever it is necessary to insure the pressure at the inlet side of the valve disc $E^6$ required for the proper spray discharge. Owing to the great length of the spring $E^7$ relative to the maximum extent of valve movement required, the pressure at the supply side of the valve, and consequently the velocity of spray discharge, is practically independent of the volume of discharge.

The supply nozzles $e$ should have loading springs analogous to the springs $E^7$ of the nozzles E, and have the above described operating characteristics of the nozzles E, and advantageously may be, and as shown are, identical in construction with the nozzles E. Since the steam pressures in the drum D and tank F are substantially equal at all times in the apparatus shown in Fig. 1, the spray action of the nozzles $e$ is wholly due to the hydrostatic pressure at the inlets of the nozzles $e$. In practice, the tension of the loading spring of each nozzle $e$ is adjusted to maintain a certain minimum height of water level in the drum D at which no spray discharge through the nozzles $e$ occurs. With loading springs $E^7$, as shown in Fig. 8, which are relatively long in comparison with the movement of the nozzle valve $E^6$ between the wide open and fully closed positions of the latter, the water level in the drum D need rise but few inches above its minimum height to give the full load rate of spray discharge.

In the normal contemplated operation of the apparatus shown in Fig. 1, the water discharged by the nozzles E is dispersed in finely divided form throughout the major portion of the steam space in the drum D, thus insuring the intimate contact of the water with the steam which is conducive to the maximum water heating and deaerating effect. The upward inclination of the axes of the nozzles E increases the height of the portion of the steam space of the drum D in which the water spray is dispersed and prolongs the average time period required for the fine water particles to move down into the body of water held in the lower portion of the drum. With apparatus constructed and proportioned generally as disclosed, the water may ordinarily be heated in the drum D or primary chamber to within two or three degrees of the temperature at which steam is supplied. The heating of the water nearly to the temperature at which steam is supplied in the upper portion of the drum D, means that but little heating is done in the tank F, so that only a small portion of the steam is condensed within the tank and a relatively large volume of uncondensed steam passes out of the tank through the pipes I, thus insuring a desirably low air content in the steam space of the tank and a continuous and effective air purging action which are conducive to efficient deaeration.

In the form of the invention shown in Figs. 4 and 5, the drum DA and tank FA are generally similar in form and relative disposition to the drum D and tank A of Figs. 1 and 2. In Figs. 4 and 5, however, a single upper spray nozzle supply chamber $C^3$ is shown, though the latter may be replaced by two such chambers as the chambers $C'$ and $C^2$ shown in Fig. 1. The construction shown in Fig. 4 differs from the construction first described, in that in Fig. 4, the steam supply pipe HA opens directly to the upper end of the drum DA and the steam supplied to the tank FA to complete the water heating and deaerating operation therein passes thereto through a branch $H^2$ from the supply pipe HA which leads to the steam space in the tank FA. Advantageously, the pipe $H^2$ includes a pressure reducing valve L whereby the steam pressure in the tank FA may be a pound or so lower than the steam pressure in the drum DA. The reducing valve L may be of any usual or suitable type, and in particular may advantageously be of the well known multi-port type.

In consequence of the use of the valve L, the water discharged into the tank FA through the nozzles $e$, may be at a temperature slightly above the boiling temperature in the tank FA, so that some of the water passing through the nozzle $e$ flashes into steam as it enters the tank FA. The amount of water so flashed in the tank FA can not be objectionably large, however, as the maximum flash is necessarily limited to that corresponding to the maximum differential between the pressures in the tank FA and drum DA permitted by the reducing valve L. The fact that the water sprayed through the steam space of the tank FA, is at the steam temperature in that space, is conducive to complete deaeration. Air liberated from the water in the steam space of the tank FA, and the steam supplied to, but not condensed in that space, passes from the latter to the vent condenser BA through a vent pipe $B^3$. The vent condenser BA has a secondary air and steam inlet connected by the pipe $B^4$ to the drum DA. Advantageously, the pipe $B^4$ opens to the annular space J in the drum DA surrounding an annular baffle member as in the construction first described. The vent condenser BA may be exactly like the vent condenser B previously described, but preferably is formed with separate steam spaces to which the inlets $B^3$ and $B^4$ open, and from which separate condensate drain connections $B^{20}$ and $B^{21}$ lead. As shown, the connections $B^{20}$ and $B^{21}$ merge into the common drainage return pipe $B^2$ opening into the lower portion of the drum DA, but their connection to the pipe $B^2$ is below the water level in the drum DA, so that the lower portions of the pipes $B^{20}$ and $B^{21}$ always contain water and are water sealed. Baffle members KA in the upper end of the drum DA break up the entering stream of steam supplied by the pipe HA, and prevent water from being splashed or thrown into the pipe HA by the action of the nozzles E.

Except for the difference in temperature conditions already mentioned, the general operation of the apparatus shown in Fig. 4 is substantially the same as that of the apparatus shown in Fig. 1. While in Fig. 4 the steam flow is downward through the portion of the drum DA into which water is sprayed by the nozzles E and the air liberated from the water passes from the drum DA and tank FA through separate pipes to the vent condenser, the differences in these respects from the apparatus of Fig. 1 are of minor importance as far as the general operation of the apparatus is concerned. In Fig. 4 the difference between the fluid pressures at the inlet and outlet of each nozzle $e$ is not due wholly to the water head in the drum DA, but is partly due to the excess of the steam pressure in the drum DA over the steam pressure in the tank EA, but in Fig. 4 as in Fig. 1, with the loaded springs of the nozzles $e$ properly adjusted, the spray discharge will be increased and decreased by and in accordance with increases and decreases in the height of water level in the drum.

The apparatus shown in Fig. 6 differs from that shown in Fig. 4 only in that the pipe $H^2$ is replaced in Fig. 6 by a pipe IA which may be similar in general disposition and in the manner of its connection with the tank F and drum D to the pipes I of the construction first described, but the pipe IA serves for the flow of steam and air from the drum DA to the tank FA and advantageously contains a pressure reducing valve L as shown, whereby the same excess of steam pressure in the drum or chamber DA over that in the tank FA may be maintained, as with the construction shown in Figs. 4 and 5. In Fig. 6 the drum DA is connected to the vent condenser BA through the pipe IA, tank FA and pipe $B^3$, and the pipe $B^4$ of Fig. 4 is omitted.

Each of the forms of apparatus shown in Figs. 1, 4 and 6 is characterized not only by its small bulk for a given heating and deaerating effect, but by the relatively low inherent cost of construction made possible with the forms of apparatus illustrated. In the construction of the drum and tank portions of the apparatus standard construction practice can be followed. For example, in providing the drum D of Fig. 1 with the nozzle supply chambers C and $C'$, use may advantageously be made as shown in Fig. 3 of similar but oppositely disposed upper and lower dished annular heads $C^5$ of commercial type and form, which have their inner edges welded to the wall of the drum D and have their adjacent edges welded to the ends of an intermediate cylindrical part $C^8$ to which is welded the outer edge of an annular plate $C^6$ which separates the chambers C and C' and has its inner edge welded to the wall of the drum D. The pipes $A^1$ and $A^2$ may be connected to the chambers $C^1$ and $C^2$ through tubular parts or nozzle members $C^7$, each welded to the corresponding head $C^5$ at the margin of an opening therein in register with the nozzle member. In effect the single nozzle supply chamber $C^3$ of Figs. 4 and 6 needs to differ from the construction shown in Fig. 3 only by the omission of the division plate $C^6$ through the part $C^8$ and one of the two nozzle parts $C^7$ may also be omitted.

In the form of the invention shown in Fig. 7, the primary and secondary chambers of the water heating and deaerating apparatus are both formed within a tank FB adapted to serve as the chemical reaction and sedimentation tank of a hot process water softening system of well known type. The walls of the secondary chamber $F^{10}$ of the apparatus of Fig. 7 are formed by the portions of the roof F' and cylindrical body of the tank FB, and by an internal partition comprising a vertical portion M extending down from the tank roof, and a lower horizontal portion M' extending from said vertical portion M to the body or cylindrical outer wall of the tank and forming the bottom wall of the compartment $F^{10}$. The steam space $F^{11}$ of the primary chamber is at the opposite side of the vertical partition member M from the chamber $F^{10}$ and the water containing portion of the primary chamber includes all of the tank interior external to the chamber $F^{10}$ and below the level of the water surface which forms the bottom wall of the steam space $F^{11}$.

In Fig. 7, all of the steam for heating and deaerating the water is initially supplied to the steam space $F^{11}$ through the steam supply connection HB, and the water treated is injected into the steam space $F^{11}$ through spray nozzles E mounted in the wall of a nozzle supply chamber CA. The latter is shown as supported by and receiving water through a vertical pipe section $A^{10}$ extending through and carried by the tank roof F' and connected at its upper ends to the section of water pipe A leading away from water outlet of the vent condenser B. To avoid appreciable heating of the water within the pipe $A^{10}$ and the resultant tendency to the deposits of impurities on the inner wall of the pipe, the latter is surrounded, as shown, by a dead air insulating space, $A^{11}$.

Water is passed from the primary chamber into the secondary chamber $F^{10}$ through spray nozzles e mounted in the wall of a nozzle supply chamber $C^{10}$ carried by and receiving water through a pipe $C^{11}$ extending upward through the partition M' forming the bottom wall of a chamber $F^{10}$. The lower end of the pipe $C^{11}$ is open to the body of the water in the primary chamber, and preferably and as shown, receives the clarified water rising in a submerged conical member or hood N employed as is customary in apparatus of this type and into which portion of the pipe $C^{11}$ extends.

The deaerated water passes from the lower portion of the chamber $F^{10}$ through an outlet $F^{12}$. Flow of water through the supply pipe A to the water inlet of the vent condenser B is controlled by a valve $A^3$ and float G responsive to the height of water level in the secondary chamber as in the constructions previously described.

Steam not condensed in the chamber $F^{11}$ and air liberated therein are passed into the chamber $F^{10}$ through a pipe connection HC analogous in function to the connection IA of Fig. 6, and including a pressure reducing valve L whereby the steam pressure in the chamber $F^{10}$ may be made a pound or so less than the steam pressure in the space $F^{11}$. Steam supplied to the chamber $F^{10}$ and not condensed therein, together with all of the air liberated in the apparatus, passes from the chamber $F^{10}$ to the condensing space of the vent condenser through a vent pipe connection $B^4$. The drain pipe $B^2$ from the vent condenser may open into the chamber $F^{10}$, or preferably and as shown, into the primary chamber below the water level in the latter.

In the apparatus shown in Fig. 7, the minimum height of water level in the primary chamber is that at which the hydrostatic pressure on the valve member of each nozzle e due to the elevation of said level above said valve member, exceeds the loading force due to the nozzle spring $E^7$ by an amount equal to the steam pressure drop effected by the reducing valve L in the connection HC. In the form shown in Fig. 7, as in the other forms of the apparatus disclosed, the spray discharged by the nozzles e is increased and decreased by and in accordance with increases and decreases in the height of water level in the primary chamber.

In the arrangements of Figs. 6 and 7, as in that of Fig. 4, the pressure reducing valve L, by limiting the excess of the steam pressure in the chamber in which the water is first heated over the steam pressure in the other chamber, and thereby limits the extent to which water can flash into steam in the last mentioned chamber.

While in accordance with the provisions of the statutes, I have illustrated and described a preferred form of embodiment of the invention, those skilled in the art will understand that changes in the form of the apparatus illustrated may be made without departing from the spirit of my invention as set forth in the appended claims, and that certain features of the invention may sometimes be used to advantage without a corresponding use of other features.

Having now described my invention, what I claim as new and desire to secure by Letters Patent is:

1. Water heating and deaerating apparatus comprising in combination a primary heating and deaerating chamber, means for spraying the water to be heated and deaerated into the upper portion of said chamber, spray discharge means for maintaining an accumulation of water in the lower portion of said chamber including one or more spray nozzles each having its inlet connected to the lower portion of said chamber and including a loaded valve member opened and closed automatically by and in accordance with increases and decreases in the hydrostatic pressure at the nozzle inlet, a second chamber enclosing a vapor space into which said spray discharge means discharges and having an outlet for the withdrawal of water as required to prevent the accumulation of water in said vapor space, and means for supplying steam to and withdrawing air from each of said chambers as required to maintain an atmosphere of steam admixed with but little air in said vapor space and in the upper portion of the first mentioned chamber.

2. Water heating and deaerating apparatus comprising in combination a primary heating and deaerating chamber, means for spraying the water to be heated and deaerated into the upper portion of said chamber, spray discharge means for maintaining an approximately constant accumulation of water in the lower portion of said chamber including one or more spray nozzles each having its inlet connected to the lower portion of said chamber and including a loaded valve member opened and closed automatically by and in accordance with increases and decreases in the hydrostatic pressure at the nozzle inlet, a second chamber enclosing a vapor space into which said spray discharge means discharges and having an outlet for the withdrawal of water as required to prevent the accumulation of water in said vapor space, and means for supplying steam to and withdrawing air from each of said chambers as required to maintain an atmosphere of steam admixed with but little air in said vapor space and in the upper portion of the first mentioned chamber, the last mentioned means including a steam supply connection to one of said chambers, an outlet for uncondensed steam and air from the other of said chambers, and a connection for the passage of steam and air between said vapor space and the upper portion of the first mentioned chamber.

3. Water heating and deaerating apparatus comprising in combination a primary heating and deaerating chamber, means for spraying the water to be heated and deaerated into the upper portion of said chamber, spray discharge means for maintaining an approximately constant accumulation of water in the lower portion of said chamber including one or more spray nozzles having its inlet connected to the lower portion of said chamber and including a loaded valve member opened and closed automatically by and in accordance with increases and decreases in the hydrostatic pressure at the nozzle inlet, a second chamber into the upper portion of which said spray discharge means discharges and having an outlet for the withdrawal of water as required to prevent the accumulation of water in said upper portion of said second chamber, means for supplying steam to the upper portion of said primary chamber and means for withdrawing air and uncondensed steam from the other of said chambers, and a pressure reducing valve passing uncondensed steam and air from the upper portion of said primary chamber into the upper portion of said second chamber to maintain a steam pressure therein lower than in said primary chamber.

4. Water heating and deaerating apparatus comprising in combination a primary heating and deaerating chamber, means for spraying the water to be heated and deaerated into the upper portion of said chamber, spray discharge means for maintaining an approximately constant accumulation of water in the lower portion of said chamber including one or more spray nozzles each having its inlet connected to the lower portion of said chamber and including a loaded valve member opened and closed automatically by and in accordance with increases and decreases in the hydrostatic pressure at the nozzle inlet, a second chamber into the upper portion of which said spray discharge means discharges and having an outlet for the withdrawal of water as required to prevent the accumulation of water in said upper portion of said second chamber, separate steam supply connections to the upper portions of the two chambers and separate means for withdrawing air and uncondensed steam from the two chambers.

5. Water heating, purifying and deaerating apparatus comprising a tank, the lower portion of which is adapted to serve as a sedimentation chamber, partition means uniting with the tank wall to form a compartment in the upper portion of the tank and a space alongside said compartment and in open communication with the portion of the tank space below said compartment, means for spraying water into and for supplying steam to and for withdrawing uncondensed steam and air from the first mentioned space, means for spraying water heated and purified in the portion of the tank external to said compartment into the upper portion of said compartment comprising an inlet opening from and below the water level in the portion of the tank external to said compartment and including one or more loaded valve members opened and closed automatically by and in accordance with the increases and decreases in the hydrostatic pressure in said inlet, means for supplying steam to said compartment, means for discharging water from said compartment to maintain a steam and air space in the upper portion thereof, and means for discharging uncondensed steam and air from the upper portion of said compartment.

6. Water heating, purifying and deaerating apparatus comprising a tank, the lower portion of which is adapted to serve as a sedimentation chamber, partition means uniting with the tank wall to form a compartment in the upper portion of the tank and a space alongside said compartment and in open communication with the portion of the tank space below said compartment, means for spraying water into and means for supplying steam to said compartment, means for spraying water heated and purified in the portion of the tank external to said compartment into the upper portion of said compartment comprising an inlet opening from and below the water level in the portion of the tank external to said compartment and including one or more loaded valve members opened and closed automatically by and in accordance with the increases and decreases in the hydrostatic pressure in said inlet, means for withdrawing water from said compartment to maintain a steam and air space in the upper portion thereof, a connection for passing uncondensed steam and air into said compartment from the first mentioned space, and means for discharging air and uncondensed steam from the upper portion of said compartment.

7. Water heating, purifying and deaerating apparatus comprising a tank, the lower portion of which is adapted to serve as a sedimentation chamber, partition means uniting with the tank wall to form a compartment in the upper portion of the tank and a space alongside said compartment and in open communication with the portion of the tank space below said compartment, means for spraying water into and means for supplying steam to said compartment, means for spraying water heated and purified in the portion of the tank external to said compartment into the upper portion of said compartment comprising an inlet opening from and below the water level in the portion of the tank external to said compartment and including one or more loaded valve members opened and closed automatically by and in accordance with the increases and decreases in the hydrostatic pressure in said inlet, means for withdrawing water from said compartment to maintain a steam and air space in the upper portion thereof, a connection including a pressure reducing valve for passing uncondensed steam and air into said compartment from the first mentioned space, and means for discharging air and uncondensed steam from the upper portion of said compartment.

8. Water heating apparatus comprising a drum having a cylindrical wall, and means for spraying water into said drum comprising spray nozzles mounted in and extending through said cylindrical wall and having their inlets at the outer side of said wall, and means uniting with said wall to form an inlet chamber surrounding and enclosing the inlet ends of said nozzles, and comprising end members, two spaced apart annular members surrounding and welded to said wall and each dished so that its outer edge approaches the outer edge of the other, the said outer edges of said dished members being connected to one another.

9. Water heating and deaerating apparatus comprising in combination a primary heating and deaerating chamber, means for spraying the water to be heated and deaerated into the upper portion of said chamber, spray discharge means for maintaining an approximately constant accumulation of water in the lower portion of said chamber, including one or more spray nozzles, each having its inlet connected to the lower portion of said chamber and including a loaded valve member opened and closed automatically by and in accordance with increases and decreases in the hydrostatic pressure at the nozzle inlet, a second chamber enclosing an upper space into which said spray discharge means discharge, and having an outlet for the withdrawal of water as required to prevent the accumulation of water in said vapor space, means for supplying steam to, and for withdrawing air and uncondensed steam from said vapor space and the upper portion of the first mentioned chamber, said means including a steam pressure regulating connection between said upper portion and said vapor space including a pressure reducing valve adapted to limit the excess of the steam pressure in the primary chamber over the steam pressure in said second chamber to a predetermined maximum, and thereby definitely limit the extent to which water sprayed into said second chamber, can flash into steam therein.

CHARLES E. JOOS.